United States Patent [19]

Hegedus et al.

[11] 3,742,034

[45] June 26, 1973

[54] PROCESS FOR THE PURIFICATION OF L-SERINE

[75] Inventors: Balthasar Hegedus, Binningen; Anna Krasso, Basel, both of Switzerland

[73] Assignee: Hoffmann-La Roche Inc., Nutley, N.J.

[22] Filed: Feb. 10, 1971

[21] Appl. No.: 114,368

[52] U.S. Cl. ...... 260/482 R, 260/534 M, 260/562 H
[51] Int. Cl. ............................................ C07c 101/18
[58] Field of Search .................... 260/482 R, 534 M

[56] References Cited
UNITED STATES PATENTS
2,921,959  1/1960  Amiard et al. ............... 260/534 M Primary Examiner—Lorraine A. Weinberger
Assistant Examiner—Paul J. Killos
Attorney—Samuel L. Welt, Jon S. Saxe, Bernard S. Leon, Gerald S. Rosen, R. H. Swope and William M. Farley

[57] ABSTRACT

A process for separating L-serine methyl ester hydrochloride and L-serine, respectively, in pure form from a mixture of amino acids containing predominantly L-threonine in addition to L-serine is disclosed. The process is carried out by forming the hydrochloride salt of the methyl ester of the amino acids and then selectively crystallizing and recovering the L-serine methyl ester hydrochloride from ethyl acetate and, if desired, hydrolyzing the thus obtained L-serine ester hydrochloride to L-serine.

6 Claims, No Drawings

PROCESS FOR THE PURIFICATION OF L-SERINE

Background of the Invention

L-serine is a well known amino acid which has utility as a medicament, a cosmetic and a starting material for peptides and other organic compounds. The compound can be obtained by several processes for example, from synthetically produced DL-serine by separation into optical anitpodes. This process, however, is technically undesirable since it requires several steps and results in low yields.

L-serine can also be produced by microbiological fermentation methods. For example, there has been developed an advantageous method for producing L-serine by utilizing bacteria in a nutrient medium with carbohydrates, hydrocarbons and other carbon sources as the nutrient sources. Suitable bacteria which produce high yields of L-serine are, for example, Arthrobacter, Brevibacterium or Corynebacterium strains. This process is described in detail, for example, in German Pat. No. 1,916,421 published Oct. 23, 1969. Even though the process of this invention is applicable to any mixture of amino acids, it relates particularly to the isolation of pure L-serine from fermentation broths resulting from the culturing of such bacteria in appropriate nutrient medium.

The product obtained by the aforementioned method and similar methods is crude and impure since it contains as impurities, amino acids other than L-serine. The major impurity is L-threonine. Usually the fermentation processes result in mixtures of from about 70 percent to about 80 percent L-serine by weight and from about 30 percent to about 20 percent L-threonine by weight. This, of course, makes it difficult or impossible to utilize the L-serine for its desired purpose particularly where the pure compound is desired. Known processes for separating the undesired amino acids require relatively complicated and expensive procedures, such as for example, separation on ion exchange resins. While these processes give good results, they are often difficult to carry out technically and are time consuming. There is thus a need for a method which is technically simple and which results in high yields of pure L-serine, particularly from crude L-serine broths manufactured by microbiological fermentation methods and which contain L-threonine.

SUMMARY OF THE INVENTION

This invention relates to a method for the production of pure L-serine from crude L-serine. More particularly, this invention relates to a method for separating pure L-serine from a mixture of amino acids containing as the predominant impurity L-threonine. Specifically, this invention relates to a method for separating L-serine from a fermentation broth produced by bacteria and which contains L-threonine as the predominant amino acid impurity.

Detailed Description of the Invention

The process of this invention is carried out by converting the amino acids, in solution, to their methyl ester hydrochlorides then selectively precipitating the L-serine methyl ester hydrochloride by means of a solvent in which all the amino acid methyl ester hydrochlorides except that of L-serine are soluble. It has been found that ethyl acetate is a non-solvent for L-serine methyl ester hydrochloride and a solvent for the other amino acid methyl ester hydrochlorides, particularly L-threonine methyl ester hydrochloride.

Since the hydrochloride of methyl ester of L-serine can be used, for example, as an intermediate for the synthesis of other compounds in the same manner as L-serine, it is not always necessary to remove the ester group from the recovered crystals in order to utilize the compound. However, if it is desired to remove the ester group this can be accomplished with conventional acid hydrolysis procedures.

As mentioned above, the L-serine methyl ester hydrochloride can be used as an intermediate for the synthesis of other compounds. One such compound is $N^1$-L-serine-$N^2$-(2,3,4-trihydroxybenzyl)-hydrazide hydrochloride. This compound can be obtained from the L-serine methyl ester hydrochloride according to the following method: The L-serine methyl ester hydrochloride is reacted with two equivalents of hydrazine hydrate in an aqueous solution. The non-reacted hydrazine hydrate is reacted with acetone, whereupon serine hydrazide hydrochloride is recovered and reacted with an aqueous solution of 2,3,4-trihydroxybenzaldehyde. After concentration of the resulting solution under reduced pressure and displacement of the water by addition of ethanol, the resulting $N^1$-L-serine-$N^2$-(2,3,4-trihydroxybenzylidene)-hydrazide hydrochloride is catalytically hydrogenated by means of a palladium-charcoal catalyst in a methanolic suspension, yielding $N^1$-L-serine-$N^2$-(2,3,4-trihydroxybenzyl)-hydrazide hydrochloride, which is a valuable decarboxylase inhibitor.

The process of this invention is suitable for separating L-serine from any of a variety of mixtures of amino acids. It has been found, however, that the process is most efficacious for the separation of L-serine from a mixture of L-threonine and L-serine. This mixture most frequently occurs when L-serine is produced by bacteria in a nutrient medium, the so-called microbiological fermentation process for producing L-serine.

While the process of this invention can be applied to a mixture containing any proportion of L-serine and L-threonine, it is most suitable for mixtures containing up to about 30 percent L-threonine by weight and at least about 70 percent L-serine by weight.

The preferred process of this invention is applicable to mixtures containing about 70 percent to about 80 percent L-serine and about 30 percent to 20 percent L-threonine by weight. The microbiological fermentation processes for producing L-serine usually result in mixtures containing about 25 percent L-threonine by weight and about 75 percent L-serine by weight. The process of this invention in its most preferred embodiment is applicable to such mixtures.

The esterification of the mixture of amino acids can be carried out by means well known in the art. For example, the mixture can be esterified by boiling in the appropriate alcohol under reflux with thionyl chloride and subsequently evaporating off the excess alcohol. This results in a mixture of the hydrochloride salts of the esters of the amino acids present in the mixture.

In order to insure that L-serine can be separated from the mixture of other amino acids it is essential to the operation of the process of this invention to form an ester which is amenable to selective crystallization. It has been found that the methyl ester hydrochloride of L-serine is suitable.

The L-serine methyl ester hydrochloride can be separated from the mixture of amino acid methyl ester hydrochlorides by dissolving them in an alkanol containing from one to three carbon atoms then adding ethyl acetate. Alternatively, the ester mixture can be added to mixture of such an alkanol and ethyl acetate. The preferred method is the former. Since the ester of L-serine is insoluble in ethyl acetate and the remaining esters are soluble, the L-serine ester selectively precipitates.

Generally, it is necessary to use only the amount of ethyl acetate which is required to precipitate the L-serine ester. It has been found that when used in a ratio of about one part by weight ethyl acetate to about four parts by weight alkanol good results are obtained. However, any convenient relative amounts of solvents can be used.

The precipitation of the L-serine methyl ester hydrochloride is expeditiously carried out in the cold, about 0° C. to about 10° C., with 0° C. preferred. The resulting precipitate contains less than 0.5 percent by weight impurities.

The mother liquor can be reworked using the same solvents to obtain higher yields. The pure L-serine methyl ester hydrochloride which is isolated melts at 163°–165° C. and is uniform on thin layer chromatography.

L-serine can be produced from the ester by conventional acid hydrolysis procedures.

The following examples illustrate the invention.

Example 1

Preparation of crude L-serine

The L-serine producing bacteria strain used was Arthrobacter paraffineus KY 7127 ATCC 21218, an isoleucine and methionine requiring microorganism.

The strain was in a 250 ml. Erlenmeyer flask which contained 20 ml. of a sterilized inoculation culture medium having 2% sorbitol, 1% meat extract, 1% peptone, 0.5% yeast extract, 0.3% NaCl and 50 mg./l. m-diamino pimelic acid. The cultivation was carried out with agitation under aerobic conditions at 30° C. for 24 hours wherein an inoculation culture was obtained.

2Ml. of the inoculation culture was inoculated into a 250 ml. Erlenmeyer flask, which contained 20 ml. of a sterilized fermentation medium of pH 7.4 containing the following:

5% n-alkane mixture ($C_{12}$–$C_{14}$)
2% $(NH_4)_2SO_4$
0.1% $K_2HPO_4$
0.1% $KH_2PO_4$
0.1% $MgSO_4 \cdot 7H_2O$
2% $CaCO_3$
1 mg./l. Thiamin
100 mg./l. L-methionine
1 ml./l. solution A
Solution A contains:
88 mg./l. $N_2B_4O_7$—$10H_2O$
37 mg./l. $(NH_4)_6 Mo_7O_{24}$—$4H_2O$
970 mg./l. $FeCl_3 \cdot 6H_2O$
8.8 mg./l. $2nSO_4 \cdot 7H_2O$
20 mg./l. $CuSO_4 \cdot 5H_2O$
7.2 mg./l. $MnCl_2 \cdot 4H_2O$ The cultivation was then carried on in the fermentation medium with agitation under aerobic conditions at 30° C. for 96 hours. There was thereby produced 3.3 mg./ml. L-serine in the culture liquor.

Example 2

100 G. of the crude L-serine broth from Example 1 consisting of about 76% L-serine and about 24% L-threonine by weight with insignificant other impurities were dissolved in 400 ml. of abs. methanol, treated with 77 ml. of thionyl chloride and boiled under reflux for about 12 hours. The reaction mixture was then evaporated under reduced pressure and the residue again dissolved in 400 ml. of methanol. The resulting L-serine methyl ester hydrochloride was crystallized by adding 100 ml. of ethyl acetate to the reaction mixture and allowed to stand at 0° C. for 4–5 hours. About 69 g. of colorless crystals were obtained from this first crystallization. The mother liquor was then almost completely evaporated and the residue allowed to stand at 0° C. for 3–4 hours in 100 ml. ethanol to result in a further 30 g. of L-serine methyl ester hydrochloride crystals. The total yield was about 88 percent. According to the thin layer chromatogram (ethyl acetate - n-butanol-formamide-triethylamine/50:50:10:5), with ninhydrin as reagent, the first crystallization was completely free from threonine. Analysis in the Beckman amino acid analyzer, showed L-serine in the first fraction with 0.16% L-threonine and 1.63% L-threonine in the second fraction.

The hydrolysis of the pure L-serine methyl ester hydrochloride was carried out as follows:

The L-serine methyl ester hydrochloride was treated with 1.5 N hydrochloric acid, boiled at reflux overnight, evaporated to dryness and taken up in ethyl alcohol, whereupon the alcoholic solution was adjusted to a pH value of 5 with diethylamine, resulting in precipitation of L-serine.

We claim:

1. A method of separating L-serine methyl ester hydrochloride from a mixture of amino acids containing L-serine and L-threonine, comprising
   a. reacting the mixture with methanol and thionyl chloride at reflux
   b. selectively crystallizing the thus formed L-serine methyl ester hydrochloride with a selective non-solvent for L-serine methyl ester hydrochloride consisting of ethyl acetate or a mixture of ethyl acetate and a lower alkanol containing 1-3 carbon atoms, and
   c. recovering the resulting L-serine methyl ester hydrochloride.

2. The process of claim 1, wherein the resulting L-serine methyl ester hydrochloride is hydrolyzed to yield L-serine which is recovered.

3. The process of claim 1 wherein the amino acid mixture used as the starting material is comprised of from about 70 percent to about 80 percent by weight L-serine and about 30 percent to about 20 percent by weight L-threonine.

4. The process of claim 1 wherein the amino acid mixture comprises about 75 percent by weight L-serine and about 25 percent by weight L-threonine.

5. The process of claim 1 wherein L-serine methyl ester hydrochloride is selectively crystallized with a mixture of an alkanol containing one to three carbon atoms and ethyl acetate.

6. The process of claim 1 wherein L-serine methyl ester hydrochloride is selectively crystallized with ethyl acetate.

* * * * *

UNITED STATES PATENT OFFICE
CERTIFICATE OF CORRECTION

Patent No. 3,742,034      Dated June 26, 1973

Inventor(s) Balthasar Hegedus and Anna Krasso

It is certified that error appears in the above-identified patent and that said Letters Patent are hereby corrected as shown below:

Cover page after "[21] Appl. No. 114,368" insert

[30] Foreign Application Priority Data

No. 3303/70    Switzerland    March 6, 1970

Signed and sealed this 20th day of August 1974.

(SEAL)
Attest:

McCOY M. GIBSON, JR.  
Attesting Officer

C. MARSHALL DANN  
Commissioner of Patents